UNITED STATES PATENT OFFICE.

ROBERT H. ADAMS, OF RIDGEWOOD, NEW JERSEY, AND HOWARD BEATTY, OF HINSDALE, ILLINOIS.

BUTTER SUBSTITUTE.

1,247,483.   Specification of Letters Patent.   Patented Nov. 20, 1917.

No Drawing.   Application filed February 10, 1917.   Serial No. 147,858.

*To all whom it may concern:*

Be it known that we, ROBERT H. ADAMS and HOWARD BEATTY, citizens of the United States, and residents of Ridgewood, New Jersey, and Hinsdale, Illinois, respectively, have invented certain new and useful Improvements in Butter Substitutes, of which the following is a specification.

This invention relates to the manufacture of edible butter substitutes especially adapted for either culinary or table purposes and has for its object the elimination of the cold-water-jacketed churns so commonly used in the manufacture of similar products where melted ingredients are employed and also the production of a sweet edible product substantially free from any unnatural i. e., chemically-prepared, fatty or inorganic bodies, which will preserve its original condition and flavor.

We are aware it has been heretofore proposed to manufacture so-called "butterin" or butter substitutes from various oils including butternut oil, almond oil, olive oil and the like by treating the same after the addition to such material of caseinous products as skim-milk, buttermilk, sour-milk, and especially fermented milk, either with or without previous hydrogenation so as to effect lactic acid fermentation. It has also been proposed, as described in Patent No. 1,014,457 of January 9th, 1912, to employ cocoanut butter in conjunction with cottolene, cow's butter, a small amount of coloring matter and salt to suit the taste, but none of the aforesaid products possess the characteristics of our improved butter substitute. Accordingly, our invention is intended as an improvement on the products of this general character.

In carrying out our invention, we preferably proceed as follows.

Pure, unheated cocoanut butter is mixed with ordinary buttermilk in the proportion of 75% of the former and 25% of the latter, a temperature of 65° F. being preferably maintained during the mixing of these ingredients and the mixing operation being continued until the product is of even consistency. The mixture is then thoroughly washed, preferably with cold water, until the effluent water is substantially clean, and the product thus obtained is then allowed to drain, after which a sufficient amount of salt to suit the taste is worked into the same in the manner customarily employed in the preparation of animal butter. If desired suitable coloring matter, such as vegetable annato, carrot-yellow, or other desirable permissible coloring ingredients may be added.

In lieu of using straight cocoanut fatty material, we may also add in lieu of a part thereof, if desired, other unmelted or normally solid, fatty bodies of vegetable or animal origin, or blended compounds of various unmelted or normally solid, vegetable and animal fats.

By the employment of these unmelted, that is normally solid fatty bodies, as above described, the same will not melt during treatment owing to the low temperature employed, and thus the necessity is entirely eliminated for employing cold-water-jacketed vessels which are so commonly employed in the preparation of both butterin and butter substitutes from melted ingredients.. Moreover, the product which we produce will remain in its original condition and retain its original flavor for a considerable time.

What we claim and desire to secure by Letters Patent is:—

1. Butter substitutes comprising a relatively large percentage of unaltered, normally solid, fatty material derived from the cocoanut, and a minor percentage of the water-insoluble solids of buttermilk.

2. Butter substitutes comprising approximately three parts of unaltered, normally solid fatty material derived from the cocoanut, and approximately one part of the water-insoluble solids of buttermilk.

Signed at Chicago, in the county of Cook, and State of Illinois the 9th day of January, 1917, and at New York the 8th day of February, 1917, respectively.

HOWARD BEATTY.
R. H. ADAMS.

Witnesses as to R. H. Adams:
W. A. JONES,
WILLIAM C. HARTRAY.